United States Patent Office 3,392,199
Patented July 9, 1968

3,392,199
AROMATIC SUBSTITUTED FLUORINATED GEM-DIAMINES AND THE PREPARATION THEREOF
William J. Middleton, Wilmington, Del., assignor to E. I. du Pont de Nemours and Company, Wilmington, Del., a corporation of Delaware
No Drawing. Continuation-in-part of application Ser. No. 329,904, Dec. 11, 1963. This application Sept. 26, 1966, Ser. No. 581,723
9 Claims. (Cl. 260—569)

ABSTRACT OF THE DISCLOSURE gem-Diamines produces by the reaction of N-aryl fluorinated ketimines with ammonia, alkyl amines or alkyl substituted hydrazines are claimed. These compounds are useful as inhibitors of free radical polymerizations.

---

This application is a continuation-in-part of my coassigned application, Ser. No. 329,904, filed Dec. 11, 1963, now U.S. Patent No. 3,326,976, which is a continuation-in-part of my coassigned abandoned application, Ser. No. 134,815, filed Aug. 30, 1961.

This invention relates to stable aromatic fluorine-containing gem-diamines and to the process for their preparation.

Geminal diamino compounds, i.e., compounds having two amino groups attached to the same methylene, mono- or disubstituted methylene group, are known to be unstable (Whitmore, "Organic Chemistry," second edition, D. Van Nostrand Co., Inc., New York, 1951, page 329). For example, the gem-diamine, diaminomethane has not been reported as existing in the free state. Some derivatives of gem-diamines are known to be stable, for example the hydrohalide salts of diaminomethane prepared from formamide are known to be stable [Whitmore, supra, and Knudsen, Ber. 47, 2698 (1914)].

This invention represents a great advance in the art by providing fluorine-containing gem-diamines which, quite unexpectedly, are stable. The stability of these fluorine-containing gem-diamines is completely unpredictable from the heretofore known properties of the nonfluorine-containing gem-diamines.

This invention is directed to stable fluorine-containing gem-diamines of the formula

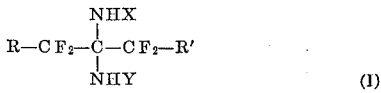
(I)

wherein R and R' are members of the group consisting of hydrogen, halogen, perhaloalkyl of up to 18 carbon atoms, and ω-hydroperhaloalkyl of up to 18 carbon atoms, the halogens in each R and R' being of atomic number 9 to 17, inclusive; X is selected from the group consisting of hydrogen, alkyl of up to 18 carbon atoms, cycloalkyl of up to 7 carbon atoms, amino, monosubstituted amino wherein the substituent is selected from the group consisting of alkyl of up to 18 carbon atoms and cycloalkyl of up to 7 carbon atoms; and Y is aryl of up to 14 carbon atoms. The term aryl is defined as a carbocyclic aromatic substituent such as phenyl, 1-naphthyl, 2-naph-thyl, 1-anthracyl and the like. Compounds wherein R, R' each contain up to 8 carbons and X and Y each contain fewer than 11 carbons are preferred.

This invention also is directed to the process for preparing the gem-diamines (I). This process comprises reacting an alkylidenimine of the formula

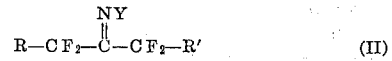
(II)

wherein Y, R and R' are as defined above with at least an equivalent molar amount of a compound of the formula $$XNH_2 \quad (III)$$

wherein X is as defined above. Preferably, the reactants are present in equimolar amounts.

The above process is illustrated by the equation

in which R, R', X and Y are as defined above.

In addition to ammonia and hydrazine, the amine reactants which can be used in the process embodiment of this invention are primary alkylamines of up to 18 carbon atoms, primary cycloalkylamines of up to 7 carbon atoms, and monosubstituted hydrazines wherein the substituent is selected from the group consisting of alkyl of up to 18 carbon atoms and cycloalkyl of up to 7 carbon atoms. For example, amine reactants include methylamine, ethylamine, n-butylamine, n-hexylamine, 2-ethyl-n-hexylamine, dodecylamine, hexadecylamine, octadecylamine, cyclopentylamine, cyclohexylamine, cycloheptylamine, hydrazine, methylhydrazine, ethylhydrazine, isopropylhydrazine, n-propylhydrazine, n-amylhydrazine, n-hexylhydrazine, dodecylhydrazine and octadecylhydrazine.

The reaction mixture is heated under reflux for at least 15 minutes in the presence or absence of a solvent. Thereafter, the product is isolated by conventional means, e.g., the solvent is evaporated and the product separated from the resultant residue by distillation. The temperature of reaction will depend upon the particular solvent and reactants used.

Solvents suitable for the process of this invention should not react with the reactants and reaction product and include those which are normally liquid at the reaction temperature and which dissolve at least some of both reactants. Examples of suitable solvents are chloroform, methylene chloride, dimethyl ether, diethyl ether, tetrahydrofuran, cyclohexane and the like.

The pressure at which the reaction is conducted is not critical. Thus, the reaction can be conducted at atmospheric, subatmospheric and superatmospheric pressure.

N-arylalkylidenimine reactants (II) used in the process embodiment are prepared by reacting, in the presence of cesium fluoride, a polyhaloketone as illustrated by the equation

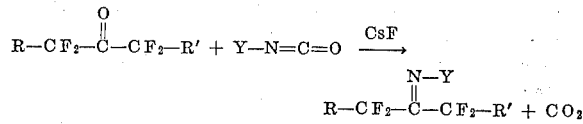

wherein R, R' and Y have the above indicated meanings.

The reaction can be conducted at autogenous pressure, preferably at temperatures of between 100–200° C. The reaction can be conducted at higher or lower temperatures than the preferred temperature range. The quantity of cesium fluoride used generally is about 10% by weight, based on the amount of the haloketone used. Higher or lower amounts of cesium fluoride can also be used.

The following examples further illustrate the invention.

Example I.—N-phenyl-1,3-dichloro-1,1,3,3-tetrafluoro-2,2-propanediamine

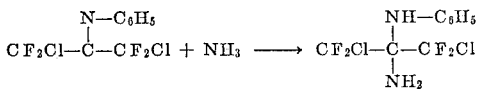

Ammonia, 2 ml., at −78° C. was slowly distilled into 13.4 g. (0.049 mole) of N-phenyl-1,3-dichloro-1,1,3,3-tetrafluoroisopropylidenimine, prepared as described below, and the reaction mixture was stirred overnight. The bright yellow color of the reaction mixture faded during this time. Distillation gave 10.8 g. of N-phenyl-1,3-dichloro-1,1,3,3-tetrafluoro-2,2-propanediamine as a colorless oil, B.P. 79–80° C. (0.3 mm.), $n_D^{25}$ 1.4983. The proton n-m-r spectrum showed a multiplet at 3.08τ (area 5) and singlets at 5.99τ (area 1) and 8.16τ (area 2).

*Analysis.*—Calcd. for $C_9H_8Cl_2F_4N_2$: C, 37.14; H, 2.77; Cl, 24.39; F, 26.12; N, 9.62. Found: C, 38.01; H, 2.89; Cl, 23.63; F, 25.05; N, 9.84.

The N-phenyl-1,3-dichloro-1,1,3,3-tetrafluoropropylidenimine used in the above experiment was prepared as follows:

A 240 ml. Hastelloy® reactor was charged with 10 g. of cesium fluoride, 100 g. (0.5 mole) of S-dichlorotetrafluoroacetone, and 50 g. of phenyl isocyanate. The charge was heated at 100° C. for 2 hours, at 125° C. for 2 hours, and 150° C. for 8 hours. Thereafter the reactor was permitted to cool to ambient temperature, vented to the atmosphere, discharged, and the residual liquid distilled. From the distillation there was recovered 10.5 g. of a yellow oil, B.P. 72 to 73° C. (5.5 mm.), $n_D^{25}$ 1.4750. The infrared spectrum contained a band at 5.92μ for CN, and the fluorine n-m-r (56.4 mc.), when determined on a cold sample, showed two triplets centered at −775 c.p.s. and −602 c.p.s. (J, 19 c.p.s.) shifted from Freon 112® standard.

The analytical data indicated that the product, obtained above, was N-phenyl-1,3-dichloro-1,1,3,3-tetrafluoropropylidenimine formed according to the equation:

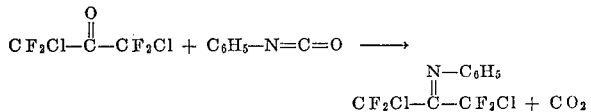

Example II.—1-(1,1,1,3,3,3-hexafluoro-2-phenylaminopropyl)hydrazine

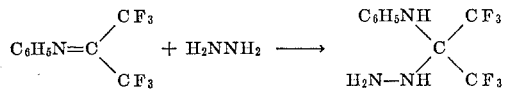

To a stirred mixture of 1.1 ml. (ca. 1.1 g.) of anhydrous hydrazine in 25 ml. of ether at room temperature was added a solution of 8.6 g. of N-phenylhexafluoropropylidenimine, prepared as described subsequently, in 25 ml. of ether. A slight exothermic effect was noted and the solution refluxed gently. The mixture was heated under reflux for two hours, at which point solid had separated on the walls of the flask. The addition of an additional 0.2 ml. of hydrazine gave no apparent change. The mixture was evaporated to dryness and the white solid residue was treated with pentane and filtered to give 6.41 g. of pale yellow crystalline 1-(1,1,1,3,3,3-hexafluoro-2-phenylaminopropyl)hydrazine, M.P. 76.3–77.9° C. A second crop of 1.64 g., M.P. 77.5–78.3° C. (total 8.05 g., 83% conversion) was obtained by cooling the filtrate.

Two recrystallizations of the first crop from ether/pentane using activated carbon gave a colorless crystalline product, M.P. 74.2–74.7° C.

Infrared spectrum: 2.95, 3.06, 3.14, 3.19μ (NH and $NH_2$); 3.24, 3.88μ (=CH); 6.21, 6.43, 6.47μ ($NH_2$ and arom. C=C); strong absorption 8–9μ for C–F; 13.29, 14.39μ (monosubstituted aromatic). Proton n-m-r spectrum (in $CHCl_3$): 2.88τ (arom. H, 5× peak); 5.74τ (broad) and 6.63τ (sharp) of equal size for NH and $NH_2$. Fluorine n-m-r spectrum (in either): single resonance for $CF_3$. Titration in ethanol-water with 0.1 N NaOH showed buffering at pH 3.5–4.5 and a neutral equivalent of 276.

*Analysis.*—Calcd. for $C_9H_9F_6N_3$: F, 41.8; N, 15.4; N.E., 273. Found: F, 41.74; N, 15.06; N.E., 276.

The N-phenylhexafluoroisopropylidenimine used in the above experiment was prepared as follows:

A 240 ml. Hastelloy® pressure reactor was charged with 24 g. of phenyl isocyanate and 4.8 g. of powdered cesium fluoride (tube precooled, $N_2$ atm.) and then 50 g. of hexafluoroacetone was added. The mixture was thereafter heated under autogenous pressure at 100° C. for 2 hours, at 125° C. for 2 hours, and at 150° C. for 8 hours. The reactor was allowed to cool, and 16 g. of volatile product was collected in a stainless steel cylinder. This material was found by infrared and gas chromatographic analysis to contain carbon dioxide as the major component, along with unreacted hexafluoroacetone. The non-volatile product, 53 g., was filtered, and the filtrate, 39 g., on distillation with a spinning band column gave 35.9 g. (75% conversion) of N-phenylhexafluoroisopropylidenimine as a yellow liquid, B.P. 48–50° C. at 22 mm. The infrared spectrum showed bands at 3.26 (CH), 6.25, 6.30, and 6.70μ (arom. C=C), 5.78μ (C=N), 13.24 and 14.46μ (monosubstituted benzene), and strong absorption in the 8μ region (CF) in support of this structure. The UV spectrum in ethanol showed k3420A=5.95 and k2330A=13.5. The fluorine n-m-r spectrum (56.4 mc., Freon 112® ref.) showed two resonances in the $CF_3$ region at −255 and +245 c.p.s. The proton n-m-r resonance showed several peaks in the aromatic region, 400 to 350 c.p.s. from $(CH_3)_4Si$ at 60 mc.

*Analysis.*—Calcd. for $C_9H_5F_6N$: F, 47.3; N, 5.81. Found: F, 47.19; N, 5.79, 5.87, 5.64.

Example III.—2-amino-2-phenylamino-1,1,1,3,3,3-hexafluoropropane

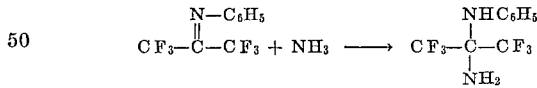

Ammonia, 5 g., was slowly distilled into a flask connected to a solid carbon dioxide-cooled reflux condenser and containing 18.4 g. of stirred N-phenylhexafluoropropylidenimine, prepared as described in Example II. The yellow color of the reaction mixture faded near the end of the addition. The reaction mixture was distilled to give 17.1 g. of 2-amino-2-phenylamino-1,1,1,3,3,3-hexafluoropropane as a colorless liquid, B.P. 48° C. (0.4 mm.), $n_D^{25}$ 1.4392. The infrared spectrum contained bands at 2.93μ, 2.98μ, and 3.1μ for NH and $NH_2$. The proton n-m-r showed a multiplet centered at 3.0τ (area 5), a singlet at 6.10τ (area 1) and a singlet at 8.23τ (area 2).

*Analysis.*—Calcd. for $C_9H_8F_6N_2$: C, 41.86; H, 3.13; F, 44.16; N, 10.85. Found: C, 42.44; H, 3.14; F, 44.23; N, 11.44.

In the right hand column of Table I are listed N-arylfluoroalkylidenimines which are obtained when the fluoroketone listed in the left hand column is reacted with the indicated aryl isocyanate according to the process of Example I. Higher homologues of ω-hydroperfluoroketone are described in U.S. 3,029,252.

TABLE I

| Reactants | Product |
|---|---|
| $CF_3\overset{O}{\underset{\|}{C}}CF_2CF_3$ + 1-naphthyl isocyanate (NCO) | N-(1-naphthyl), $CF_3\overset{\|}{\underset{\|}{C}}CF_2CF_3$ (imine) |
| $C_3F_7\overset{O}{\underset{\|}{C}}C_5F_{11}$ + 1-naphthyl isocyanate (NCO) | N-(1-naphthyl), $C_3F_7-\overset{\|}{\underset{\|}{C}}-C_5F_{11}$ |
| $HCF_2CF_2-\overset{O}{\underset{\|}{C}}-CF_3$ + phenyl isocyanate (NCO) | N-phenyl, $HCF_2CF_2-\overset{\|}{\underset{\|}{C}}-CF_3$ |
| $ClCF_2CF_2-\overset{O}{\underset{\|}{C}}-CF_2Cl$ + 1-anthracyl isocyanate | $ClCF_2CF_2-\overset{N\text{-}1\text{-}anthracyl}{\underset{\|}{C}}-CF_2Cl$ |
| $ClCF_2-\overset{O}{\underset{\|}{C}}-CF_2Cl$ + phenyl isocyanate (NCO) | N-phenyl, $ClCF_2-\overset{\|}{\underset{\|}{C}}-CF_2Cl$ |
| $H(CF_2)_{10}\overset{O}{\underset{\|}{C}}(CF_2)_{10}H$ + α-naphthyl isocyanate | $H(CF_2)_{10}\overset{N\text{-}\alpha\text{-naphthyl}}{\underset{\|}{C}}-(CF_2)_{10}H$ |
| $HC_6F_{12}-\overset{O}{\underset{\|}{C}}-C_6F_{12}H$ + β-naphthyl isocyanate | $HC_6F_{12}-\overset{N\text{-}\beta\text{-naphthyl}}{\underset{\|}{C}}-C_6F_{12}H$ |

The diamines of this invention are useful as polymer intermediates and as inhibitors in free radical vinyl polymerizations. For example, the diamines react with diisocyanates to give polyureas which have valuable properties.

The use of these diamines as inhibitors in the free radical polymerization of styrene is illustrated as follows:

A solution of 20 g. of freshly distilled styrene in 50 ml. of benzene containing 0.1 g. of α,α'-azobisisobutyronitrile was heated at reflux for five hours. Extensive polymerization occurred.

The polymerization was repeated with the addition of 1 g. of N-phenyl-1,3-dichloro-1,1,3,3-tetrafluoro-2,2-propanediamine to the benzene solution. No polymerization occurred.

The foregoing detailed description has been given for clarity of understanding only and no unnecessary limitations are to be understood therefrom. The invention is not limited to the exact details shown and described for obvious modification will be apparent to those skilled in the art.

The embodiments of the invention in which an exclusive property or privilege is claimed are defined as follows:

1. A compound of the formula

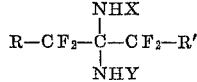

wherein R and R' are members of the group consisting of hydrogen, fluorine, chlorine, perfluoroalkyl, ω-chloroperfluoroalkyl or ω-hydroperfluoroalkyl of up to 8 carbon atoms; X is selected from the group consisting of hydrogen, alkyl of up to 18 carbon atoms, cycloalkyl of up to 7 carbon atoms, amino, monosubstituted amino wherein the substituent is selected from the group consisting of alkyl of up to 18 carbon atoms and cycloalkyl of up to 7 carbon atoms; and Y is aryl of up to 14 carbon atoms.

2. A compound as defined in claim 1 wherein R, R', X and Y each contain fewer than 11 carbon atoms.

3. N - phenyl - 1,3 - dichloro - 1,1,3,3 - tetrafluoro-2,2-propanediamine.

4. 1 - (1,1,1,3,3,3 - hexafluoro - 2 - phenylaminopropyl)hydrazine.

5. 2 - amino - 2 - phenylamino - 1,1,1,3,3,3 - hexafluoropropane.

6. Process for preparing a compound of claim 1 comprising heating, under reflux conditions in a reaction medium inert to the reactants and reaction products, an alkylidenimine of the formula

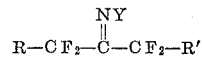

with at least an equivalent amount of a compound of the formula $$XNH_2$$

wherein R, R', X and Y are as defined in claim 1.

7. Process of claim 6 for preparing N-phenyl-1,3-dichloro-1,1,3,3-tetrafluoro-2,2-propanediamine comprising reacting, at about −78° C., N-phenyl-1,3-dichloro-1,1,3,3-tetrafluoroisopropylidenimine and ammonia.

8. Process of claim 6 for preparing 1-(1,1,1,3,3,3-hexafluoro-2-phenylaminopropyl)hydrazine comprising reacting, at room temperature, N-phenylhexapropylidenimine and anhydrous hydrazine.

9. Process of claim 6 for preparing 2-amino-2-phenylamino-1,1,1,3,3,3-hexafluoropropane comprising reacting, at about −78° C., N-phenylhexafluoropropylidenimine and ammonia.

References Cited

Zeifman et al.: "Dokl. Akad. Nauk. SSSR," vol. 153, No. 6, pages 1334–7 (1963).

CHARLES B. PARKER, *Primary Examiner.*

R. V. HINES, *Assistant Examiner.*